United States Patent [19]

Zabala et al.

[11] Patent Number: 4,471,969

[45] Date of Patent: Sep. 18, 1984

[54] COMBINATION FOLDING STOOL AND DOLLY

[75] Inventors: Teresa A. Zabala, 3735 Benton St., NW., Washington, D.C. 20007; David L. Affleck, Scotts Valley, Calif.

[73] Assignees: Teresa Ann Zabala, Washington, D.C.; Judith Ann Olson, San Francisco, Calif.

[21] Appl. No.: 361,297

[22] Filed: Mar. 24, 1982

[51] Int. Cl.³ .............................................. B62B 1/04

[52] U.S. Cl. ...................................... 280/30; 108/18; 108/19; 108/129; 182/20; 248/439; 280/32.6; 280/639; 297/439

[58] Field of Search .................... 280/30, 31, 32, 32.5, 280/32.6, 32.7, 641, 64, 2, 35, 639, 646; 297/439, 461, 462; 108/11, 12, 18, 19, 15 J, 132, 129; 182/20, 155; 5/315 R; 248/439

[56] References Cited

U.S. PATENT DOCUMENTS

| | | | |
|---|---|---|---|
| 279,778 | 6/1883 | Long | 280/30 X |
| 1,331,538 | 2/1920 | Spencer | 108/132 |
| 1,925,613 | 9/1933 | Stanger | 280/32.6 UX |
| 2,508,627 | 5/1950 | Spiegel et al. | 108/19 |
| 2,611,417 | 9/1952 | Henry et al. | 280/30 X |
| 2,672,391 | 3/1954 | Moore | 280/30 X |
| 2,771,299 | 11/1956 | Hinchman | 280/30 |
| 3,271,075 | 9/1966 | Good | 108/129 X |
| 3,954,155 | 5/1976 | Guidara | 182/20 |
| 4,026,221 | 5/1977 | Wilson et al. | 108/19 X |

FOREIGN PATENT DOCUMENTS

| | | | |
|---|---|---|---|
| 424274 | 1/1926 | Fed. Rep. of Germany | 280/30 |
| 1041643 | 10/1958 | Fed. Rep. of Germany | 108/19 |
| 909668 | 1/1946 | France | 280/30 |
| 1005675 | 12/1951 | France | 280/30 |
| 20735 | 10/1899 | United Kingdom | 108/19 |

*Primary Examiner*—Joseph F. Peters, Jr.
*Assistant Examiner*—Mitchell J. Hill
*Attorney, Agent, or Firm*—Flehr, Hohbach, Test, Albritton & Herbert

[57] ABSTRACT

A combination portable dolly and collapsible stool for transporting photography equipment and the like, and for providing an elevated platform for taking photographs. The legs of the stool are pivotally mounted at opposite ends of a rectangular box platform and are braced by members (which may be U-shaped) that are pivotally secured to vertical portions of the stool legs and which have free ends that are secured by a latching means in either extended leg bracing position or in collapsed carrying position.

Rollers are mounted on the exterior of the legs adjacent the pivots so that when the legs are collapsed the rollers support the base platform as a dolly. In such collapsed condition, the legs rest within each other and are secured together by an interlocking means.

6 Claims, 6 Drawing Figures

10 12 20 26 14 14 18 28 32 30

4 26 30 28 34 34 42 5 5 32 31 40 38 4

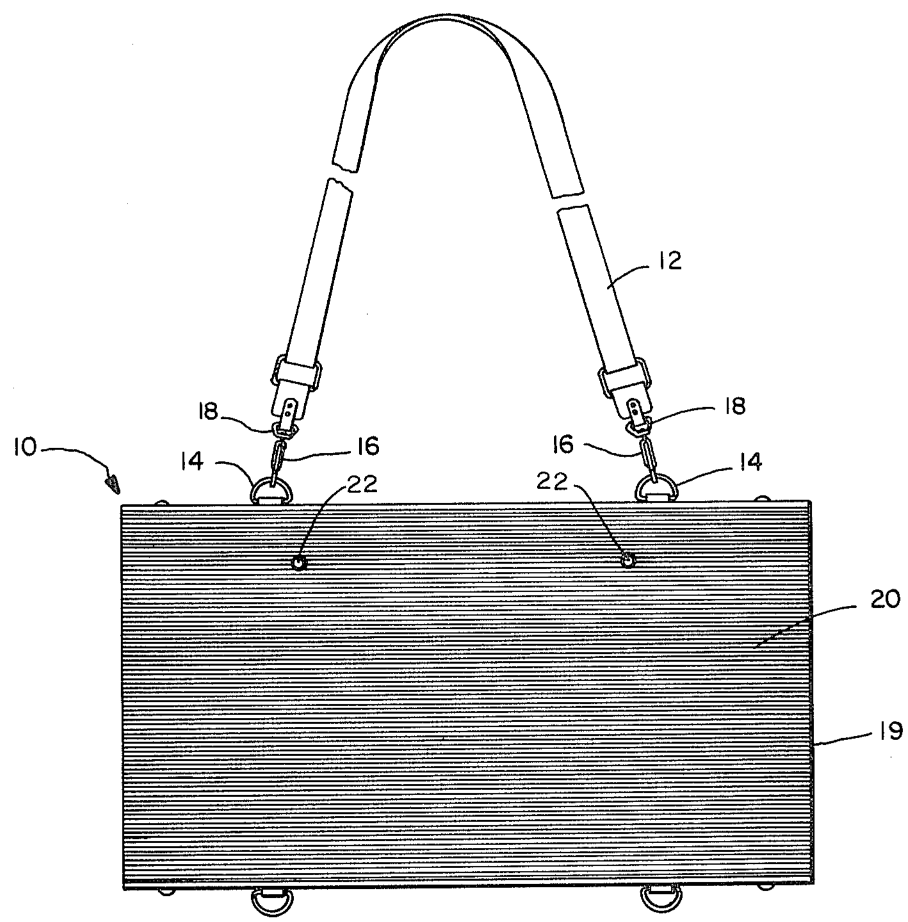
FIG.—1
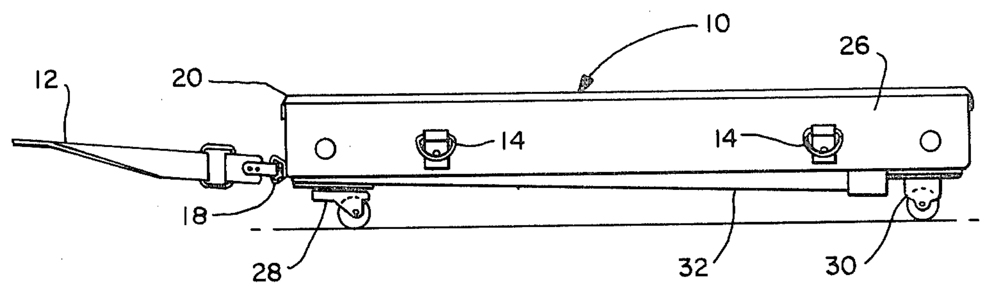
FIG.—2

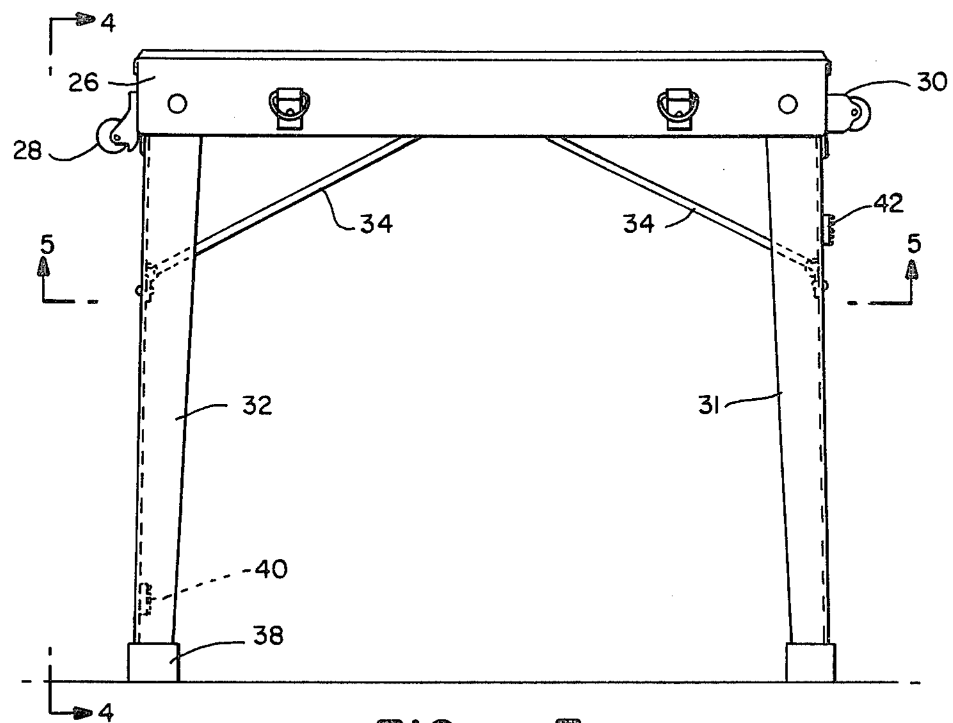
FIG.—3
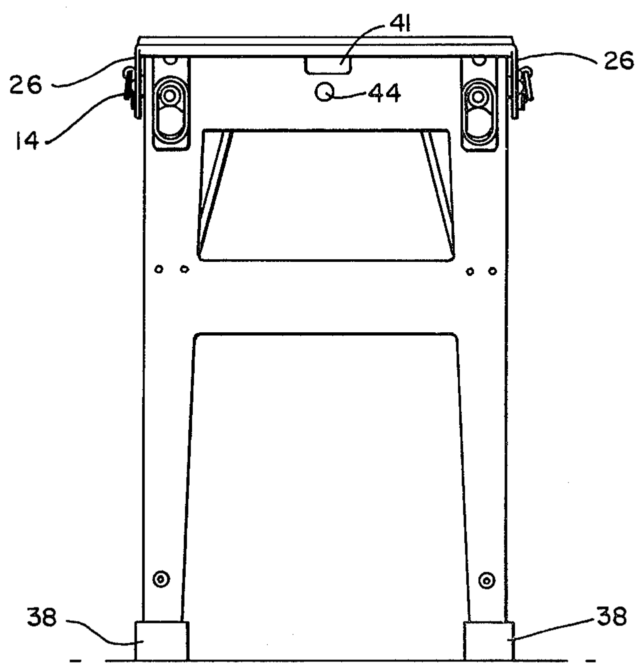
FIG.—4

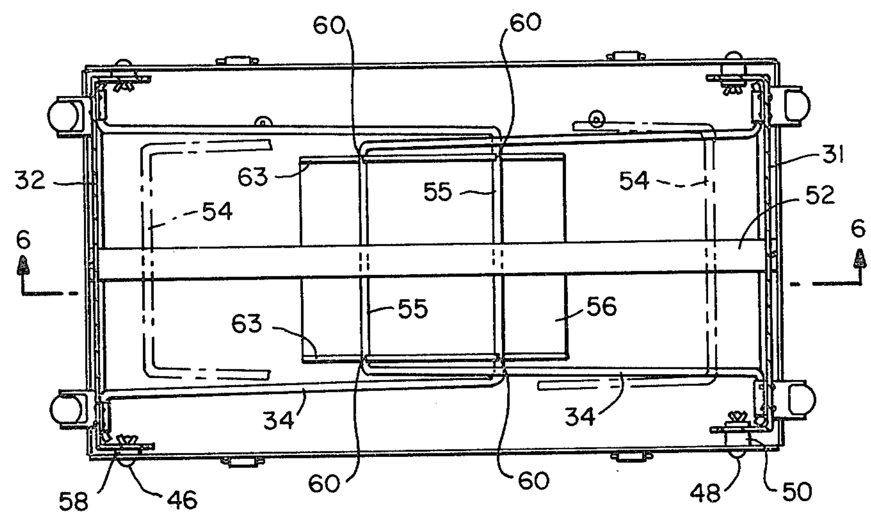
FIG.—5
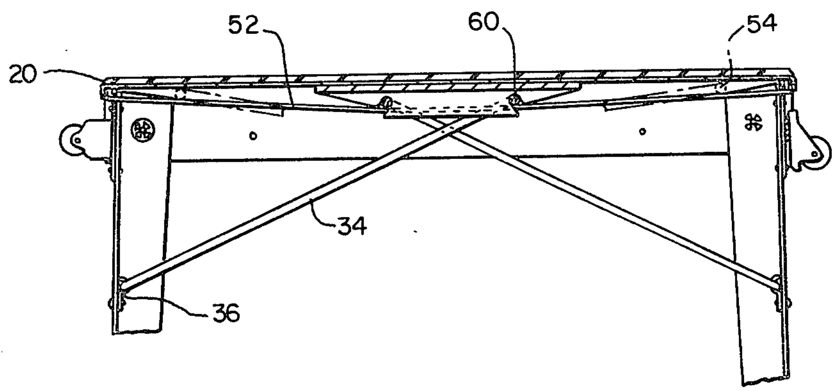
FIG.—6

COMBINATION FOLDING STOOL AND DOLLY

The present invention relates generally to collapsible stools; and more particularly to a combination portable folding stool and dolly.

It is often necessary that a photographer carry a large assortment of equipment, especially different lenses, camera bodies, tripods, flash equipment, and assorted photographic film. In addition, it is often useful to be able to take a photograph from above a crowd, or to take a photograph from an elevated position. Prior to the present invention, no satisfactory combination device has been available to satisfy these separate demands.

Previous devices in this general field include a combination luggage carrier and table (U.S. Pat. No. 1,925,613) which, however, is incapable of acting as a stool. Other combination devices in this general field include a combination stool and game table for hunters (U.S. Pat. No. 2,771,299), a collapsible footstool (U.S. Pat. No. 3,271,075), and a step ladder dolly (U.S. Pat. No. 3,954,155). However, none of these prior devices appear to have any direct relationship to the above problem facing photographers, with which the present invention is directly concerned. Specifically, none of these prior patents is capable of obtaining the objects of the present invention.

SUMMARY OF INVENTION AND OBJECTS

Broadly described, the present invention comprises a combination portable folding stool and dolly having a rectangular base platform and a pair of braced folding legs pivotally mounted at opposite ends of the base platform. Rollers are mounted on the legs, adjacent the pivot mounts and in a spaced apart relation. When the legs are in collapsed position, these rollers support the dolly and the legs rest within one another held in place by interlocking or adhesive means, for example, pads of interlocking plastic fingers or so-called "VELCRO" (trademark) pads. When extended, the legs are held in place by bracing bar pivotally attached to each leg and secured at their free ends by a latching means. The free ends of the bracing bar may be disposed underneath a resilient holding member, such as a leaf spring, which may run the length of the rectangular base platform. A strap may be connected to the base platform either to carry the combination stool and dolly, or to act as a lead for the dolly.

One object of the present invention is, therefore, to provide a small, easily portable dolly and folding stool combination.

Another object of the present invention is to provide a folding stool combination of such character which is extremely sturdy yet very light in weight.

Another object of the present invention is to provide a folding stool of such character which also comprises a small and easily transported dolly.

A further object of the present invention is to provide a combination folding stool and dolly which enables photographic equipment to be easily transported and which allows a photographer to get above the crowd to take photographs.

Still a further object of the present invention is to provide a light weight portable folding stool and dolly on which a photographer's tripod can be mounted.

Further aspects of the invention will become apparent from the appended drawings and from the detailed description.

BRIEF DESCRIPTION OF THE DRAWINGS

FIG. 1 is a top plan view of an embodiment of the present invention.

FIG. 2 is a side view of such embodiment of the invention when used as a dolly.

FIG. 3 is a side view of such embodiment of the invention when used as a stool.

FIG. 4 is an end view along the line 4—4 of FIG. 3.

FIG. 5 is a sectional view along the line 5—5 in FIG. 3.

FIG. 6 is a sectional view along the line 6—6 in FIG. 5.

DETAILED DESCRIPTION OF THE INVENTION

FIG. 1 illustrates the use of the carrying strap 12 as a means to easily transport the combination stool-dolly 10 of the present invention. The stool-dolly generally comprises a platform 19 to which is applied a nonskid surface 20. Threaded holes 22 are provided either to mount cameras, or to provide a means for stabilizing or securing camera supports like tripods or monopods. The stool-dolly can be supported by the strap 12, which may be either carried in hand or slung over a shoulder. Strap 12 is attached to the stool-dolly by a pair of swivel snap hooks 16. The swivel snap hooks include a swivel 18 which is attached at one end to the strap and at the other to a snap hook 16. The strap 12 through the snap hook arrangement can be attached to the step stool-dolly arrangement the snap hooks 16 onto rings 14, which are disposed on at least one side of the flanges which depend from the base platform 19.

FIG. 2 illustrates the present invention when it is used as a dolly. This side view also illustrates the manner in which the nonskid surface is applied to the surface of the base platform. In the preferred embodiment illustrated, a rubber mat 20 is adhesively applied to the base platform. Alternatively, adhesively applied sand paper or other nonskid or antiskid material may be applied. Depending flanges 26 are perpendicular to the base platform and form the sides of the dolly. The ends of the dolly are open, allowing the legs to pivot freely.

As a dolly, the entire structure is supported on four rollers. As shown in FIG. 2, front rollers 28 swivel, while rear rollers 30, are in fixed relationship with the base platform. This allows the dolly to be easily maneuvered. When used as a dolly, the legs which support the device as a stool are folded up within the cavity formed by the flanges and the platform. These legs nest, one within the other, so that in the profile view shown in FIG. 2, only the outermost leg, 32, may be seen. To facilitate rolling, carrying movements of the dolly, the strap 12 is secured to the dolly (as shown in FIG. 2) by inserting one of the hooks 16 through the slot 41 and pulling the hook 16 into a hole 44, shown in FIG. 4.

FIG. 3 illustrates the present invention when employed as a stool. The two legs, 31 and 32 are pivotally mounted between the flanges 26. These legs can be secured in substantially perpendicular relationship to the base platform by means of braces 34. These braces are pivotally secured to each leg by means of clasps 36. As shown in FIG. 5, the braces can be U-shaped in construction, with their ends bent to be easily received in the clasps 36. Legs 31 and 32 are each integral structures cut roughly in the shape of a square A (see FIG. 4). When the legs are collapsed to change the stool to a dolly, leg 31 is folded in first, followed by leg 32. Leg 32 rests on top of leg 31 and is attached thereto by attaching means 40 and 42. These attaching means may be interlocking plastic fingers, or "VELCRO" (trademark) pads. The purpose of the attaching means 40, 42, is to keep the nesting legs secure, so that they do not drop while the present invention is being used as a dolly.

In the preferred embodiment illustrated, the foot of each leg is also enclosed by a nonskid shoe 38.

FIG. 5 is a view of the underside of the stool of the present invention. As shown, the interior legs 31 are spaced away from the depending flanges by spacer 50. The outer legs 32 are spaced away from the depending flanges by a smaller spacer 58. This allows the exterior legs and the interior legs to nest within each other. The braces 34 are secured underneath the platform 19 by means of a leaf spring 52 which runs the length of the underside of the base platform. Thus, when the legs are folded in, the braces 34 are held out of the way, as illustrated by the dotted lines 54 in FIGS. 5 and 6.

FIG. 6 shows the means by which the free ends 55 of the braces 34 are secured when the present invention is employed as a stool. The free ends 55 of the U-shaped braces 34 are slid into slots 60 of plate 56. Plate 56 is secured to the under surface of the base platform, preferably by welding. Plate 56 has ridges 63 which are perpendicular to the surface of the base platform. The placement of these ridges is better illustrated in FIG. 5. By firmly securing the free ends 55 of the U-shaped braces, the structure of the present invention performs as a very stable stool. When the legs are swung into the interior of the body, the rollers become parallel to the surface of the body, thus transforming the stool into a dolly.

The present invention provides many advantages. As indicated, the combination device is easily converted from the carrying position of FIG. 1 to either the dolly position of FIG. 2 or the stool position of FIGS. 3 through 6. Because the combination device is extremely light in weight, it can be easily carried by the shoulder strap 12, thus leaving the hands free to carry photographic equipment. Alternatively, when collapsed to the dolly position of FIG. 2, heavy photographic equipment can be transported to and from the photography area by loading the same on the dolly and pulling with the strap 12. Once in place, the photographer can quickly extend the legs of the combination device to form a stool as best illustrated in FIGS. 3 and 4, thereby enabling the photographer to shoot clear photographs from an elevated position above the crowd. Alternatively, camera mounts such as tripods can be mounted on the stool by means of the threaded holes 22, thus stabilizing the camera in an elevated position. When the photography episode has been completed, the stool can be just as easily collapsed for use either as a dolly to remove the camera equipment, or for carrying by means of the shoulder strap 12.

What is claimed:

1. In a combination portable folding stool and dolly, a base platform of substantially rectangular shape, a pair of folding legs pivotally mounted at opposed ends thereof and disposed in spaced relation to each other such that when said legs are in a folded position they extend substantially the length of said base platform and nest within each other in an overlapping position, rollers mounted in spaced apart relation directly on said pair of folding legs adjacent the pivot mount and exterior thereof, said rollers acting as rolling dolly supports in a collapsed position of said folding legs, bracing means pivotally mounted to said pair of folding legs, said bracing means having a free end, means to engage and hold said free end of said bracing means in a collapsed position when said platform acts as a dolly, and means to hold said free end of said bracing means in a braced position wherein said platform is supported by said folding legs to serve as a stool, elongated flexible strap means having attachment means at opposite ends thereof, cooperative attachment means on a common side of said base platform to engage the attachment means on said flexible strap so that the same serves as a carrying strap for the combination device in a collapsed position, and additional cooperative attachment means at each end of said base platform to engage one end of said strap so that the same functions as a pulling strap when the combination device is collapsed to serve as a dolly.

2. A combination device as in claim 1 wherein said pair of folding legs is provided with interlocking means engageable with each other to serve as an interlock holding said pair of folding legs in said collapsed position.

3. A combination device as in claim 2 wherein said interlocking means comprise projecting interlocking fingers extending outward from adjacent surfaces of said pair of folding legs when in said collapsed position.

4. A combination device as in claim 1 wherein said means to hold said bracing means in said collapsed position comprise disposing said free end of said bracing means between the underside of the base platform and a leaf spring which is attached to said base platform at opposite ends thereof.

5. A combination device as in claim 1 wherein said means to hold said bracing means in said braced position comprise disposing said free end of said bracing means in slots provided on the underside of the base platform.

6. A combination device as in claim 5 wherein said bracing means are restrained in said slots by disposing said free end of said bracing means under a leaf spring which is attached to the base platform at opposite ends thereof.

* * * * *

UNITED STATES PATENT AND TRADEMARK OFFICE

CERTIFICATE OF CORRECTION

PATENT NO. : 4,471,969

DATED : September 18, 1984

INVENTOR(S) : Teresa A. Zabala et al.

It is certified that error appears in the above-identified patent and that said Letters Patent is hereby corrected as shown below:

Column 1, line 43, delete "bar" and insert --members--.

Column 1, line 45, delete "bar" and insert --members--.

Column 2, line 34, delete "arrangement" and insert --by clipping--.

Signed and Sealed this

*Fourteenth* Day of *May 1985*

[SEAL]

*Attest:*

DONALD J. QUIGG

*Attesting Officer* *Acting Commissioner of Patents and Trademarks*